May 19, 1925. 1,538,034
A. E. FREY
CLUTCH
Filed Sept. 7, 1922 2 Sheets-Sheet 1

INVENTOR
ALBERT E. FREY
BY
William MacGlashan
ATTORNEY

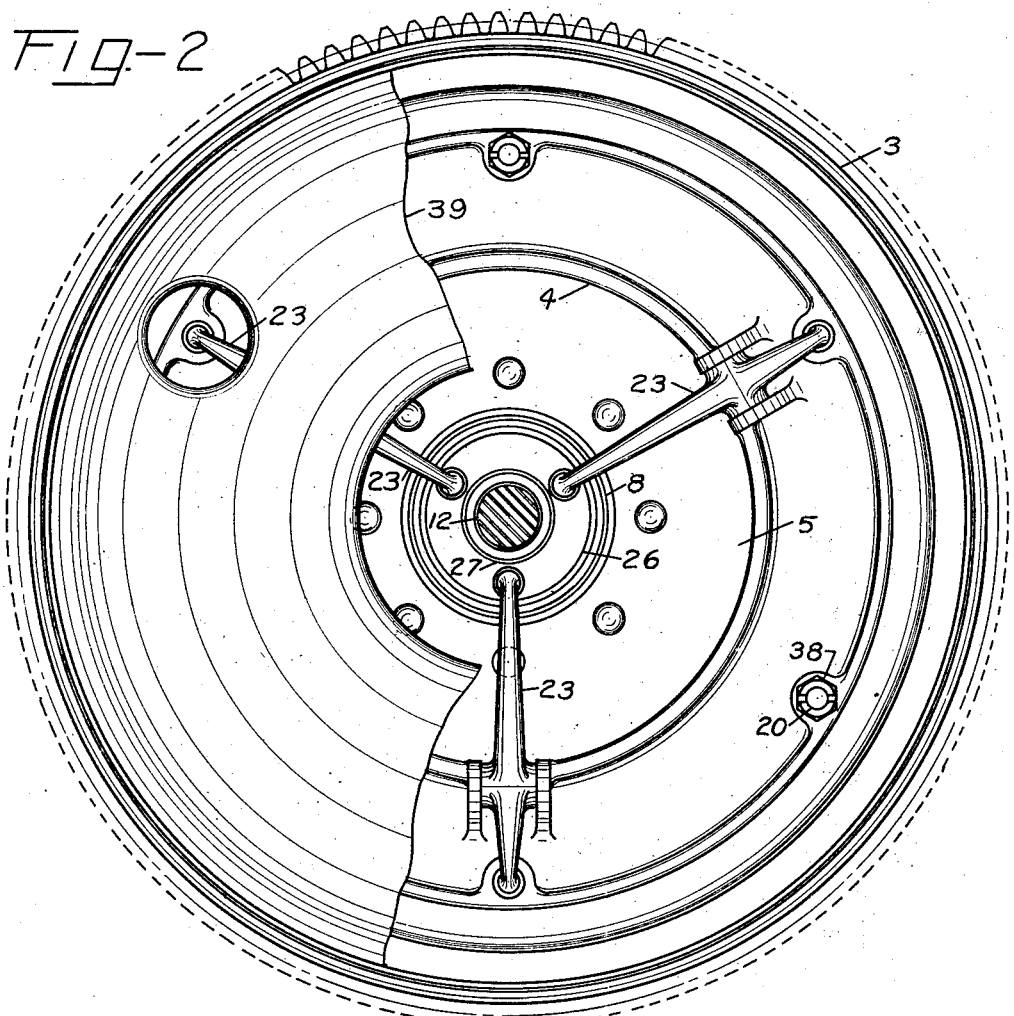
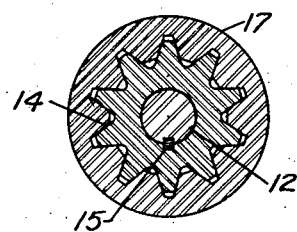

Patented May 19, 1925.

1,538,034

UNITED STATES PATENT OFFICE.

ALBERT ERNEST FREY, OF DETROIT, MICHIGAN, ASSIGNOR TO STUDEBAKER CORPORATION, A CORPORATION OF NEW JERSEY.

CLUTCH.

Application filed September 7, 1922. Serial No. 586,746.

*To all whom it may concern:*

Be it known that I, ALBERT ERNEST FREY, a citizen of the United States of America, and resident of Detroit, in the county of Wayne and State of Michigan, have invented certain new and useful Improvements in Clutches, of which the following is a specification.

This invention relates to friction clutches and the object is to provide such a clutch as will be simple in construction, positive in operation and economical to manufacture.

It belongs to that class of clutches known as plate or disc clutches and hereinafter reference to the word clutch will imply a clutch of this type.

One of the objects is to provide a clutch in which the throw-out arms will be automatically adjusted for pressure and clearance. Another object is to provide a simple clutch throw-out mechanism. Another object is to provide a clutch which will be easy to assemble and to dis-assemble while in place without disturbing separate cooperating mechanisms. Still another object is to provide a clutch which will be simple and economical to manufacture.

These being among the objects of the present invention, the same consists of certain features of construction and combinations of parts to be hereinafter described and claimed with reference to the accompanying drawings, which illustrate a suitable embodiment of the invention having the above and other objects in view.

In the drawings:—

Fig. 2 is a view of the clutch of Fig. 1 taken on the line AA of Fig. 1 and having the cover plate partially broken away.

Fig. 3 is a sectional view of the rear slip joint taken on the line X—X of Fig. 1.

Figure 4 is a plan view of one of the spring retaining washers.

Figure 1:
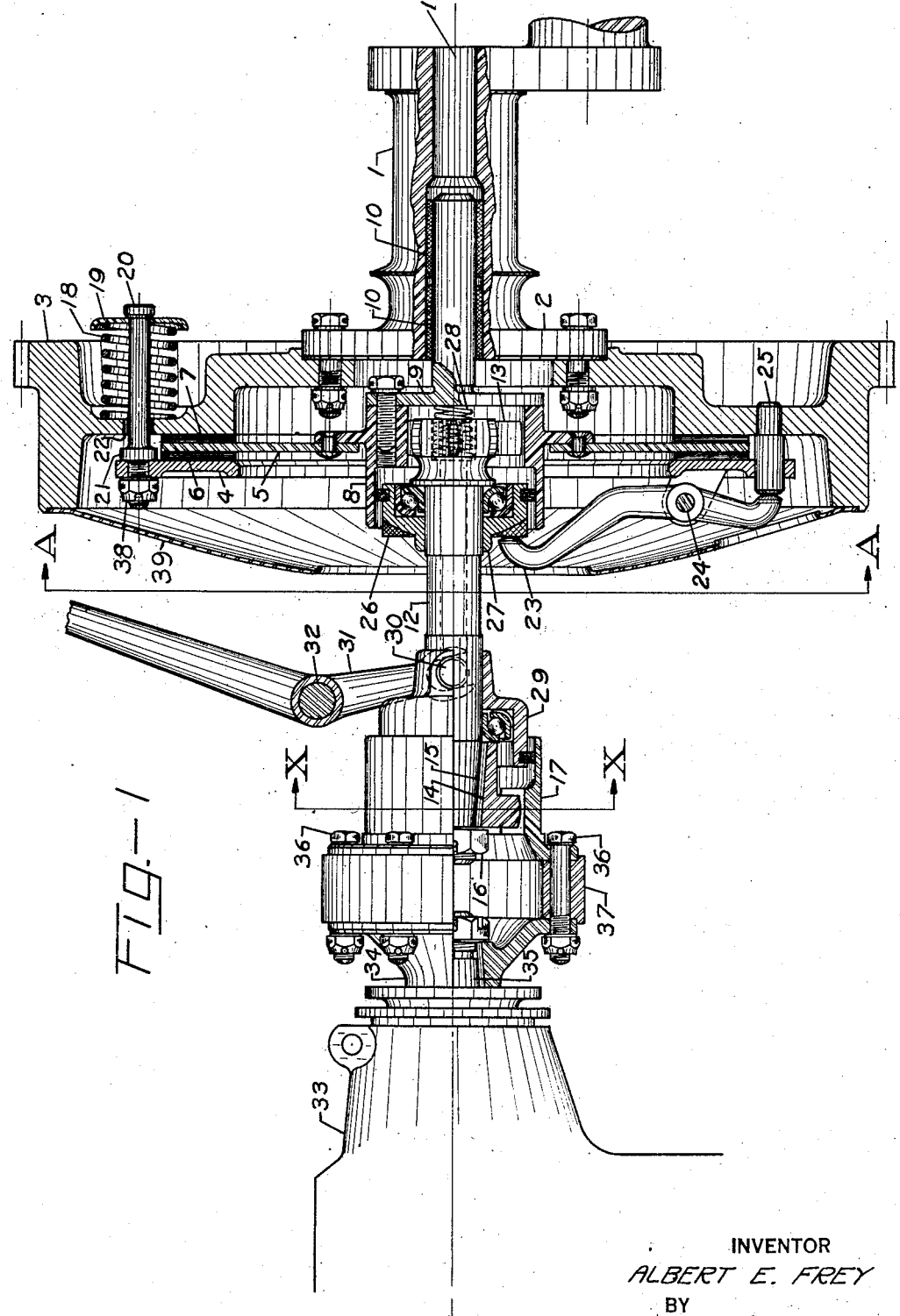
Fig. 1 is a partially sectioned side view of a clutch embodying my present invention with cooperating parts.

The drive shaft 1 has a flange 2 at one end thereof by which it is adapted to be secured to the flywheel 3 which carries a ring 4 adapted to move axially. Between the inner face of the ring 4 and the adjacent face of the flywheel 3 is a disc 5 spaced apart from the ring 4 and flywheel 3 by the rings 6 and 7 composed of suitable clutch facing of fibrous or other material. The disc 5 is riveted to a hub member 8 which in turn is fastened to and turns with the member 9 which is journaled in the bushings 10 in the opening 11 formed in the drive shaft 1. In this particular case the drive shaft 1 is the crankshaft of an internal combustion engine and as the opening 11 leads into the crank case of the same, the oil spray in the crank case affords ample lubrication for the bearing of the member 9. The inner face of the hub member 8 is provided with teeth similar to those of internal gears. A driven member 12 whose end 13 is provided with external teeth fits into the internal gear of the hub member 8 in the manner shown in Fig. 3. The teeth of the end 13 of the driven member 12 are rounded in such a manner as to allow universal movements of the driven member 12 in respect to the hub member 8 and at the same time allow the driven member 12 to move axially in the hub member 8. The other end of the driven member 12 is tapered and a gear member 14 similar in shape to the end 13 is held thereon by a key 15 and nut 16. It engages an internal gear member 17, a section of which is shown in Fig. 3, and which allows the same universal and axial movement of the driven member 12 as does the joint at the opposite end.

The disc 5 is normally held securely between the ring 4 and flywheel 3 by the pressure of the springs 18 acting on the washers 19 under the heads of the bolts 20. The bolts 20 have flanges 21 larger than the apertures 22 thru which the heads of the bolts 20 are adapted to pass. In assembling, the head of the bolt 20 is passed thru the aperture 22, the spring 18 is placed over the bolt 20 and compressed, and the washer 19 which is provided with a transverse U slot is placed over the spring and under the head of the bolt 20. This allows the ring 4 to be removed by taking off the nuts 38, without disturbing the springs 18, washers 19 and bolts 20. Three arms 23 are pivoted at 24 on the ring 4, the outer ends resting on the pins 25 which are supported in the flywheel 3 thus allowing axial movement of the ring 4 but preventing relative rotation between the ring 4 and flywheel 3. The inner ends of the arms 23 rest on a washer 26 which has a spherical seat on the throw out bearing cup 27 rotatably mounted on the driven shaft 12.

This spherically seated washer 26, by sliding on its spherical seat, automatically adjusts itself to the pressure of the ends of the three arms 23 resting upon it, doing away with the necessity of providing adjusting screws for equalizing the clearance and pressure of the arms 23. A spring 28 mounted in the end 13 of the driven shaft 12 normally causes a rearward pressure on the throwout bearing cup 27 and washer 26, putting a slight pressure on the arms 23 and preventing any rattling of the same. The shifter bearing cup 29 is rotatably mounted at the rear end of the driven shaft 12 and bears thru its bearing against the gear member 14. The shifter bearing cup 29 is provided with two pins 30 over which the slotted ends of a forked shifter pedal lever 31 are mounted, the shifter pedal lever being pivoted at 32. Upon forcing forward the upper end of the shifter pedal lever 31 the slotted lower end over the pins 30 moves rearwardly carrying with it the shifter bearing cup 29 and the driven shaft 12 with the gear member 14 and throw-out bearing cup 27. The rearward movement of the throw-out bearing cup 27 forces the ends of the arms 23 rearwardly thus causing the ring 4 to move away from the flywheel 3 against the pressure of the springs 18, leaving the disc 5 free between the ring 4 and flywheel 3 and thereby disconnecting the driven shaft 12 from the drive shaft 1. Upon release of the forward pressure on the upper end of the shifter pedal lever, the springs 18 draw the ring 4 towards the flywheel 3, again clamping the disc 5 between the faces of the same and returning at the same time the rest of the mechanism to its normal position.

The rear slip joint connects the driven shaft to the transmission 33. A flange 34 on the forward end of the transmission shaft 35 is connected to the internal gear member 17 by bolts 36 thru the collar 37. By removing the collar 37, the clutch cover 39, the bolts 36, and nuts 38, the driven shaft 12 and ring 4 with all their accompanying mechanism may be removed from their place for inspection or repair without disturbing any other mechanism and providing ready access to all parts of the clutch mechanism. The bolts 20, springs 18, and washers 19 remain in their place due to the fact that the flanges 21 on the bolts 20 are not able to pass thru the apertures 22. The disc 5, hub member 8 and member 9 are held in place because the member 9 is journaled in the drive shaft 1 but may be easily removed by withdrawing the end of the member 9 from the bearing.

It is thus seen that this clutch embodies a very much simplified form of mechanism, eliminating the usual complicated and expensive form of sleeve type slip joint between the clutch and transmission, and adjusting screws on the clutch throw-out arms. It provides a long, amply lubricated bearing in the drive shaft for the clutch disc, a simple throwout mechanism that needs no adjustment and is composed of few parts, and further provides ease and accessibility in dismantling and re-assembling the clutch itself while in position.

Although I have shown a special type of slip joint at the forward end of the driven shaft, other forms may be substituted which will allow the driven shaft to be moved axially for disengaging the clutch.

Formal changes may be made in the specific construction of the invention described without departing from the spirit or substance of the broad invention, the scope of which is commensurate with the appended claims.

What I claim is:—

1. In a device of the class described, a fly wheel, a ring, a disc interposed between said fly wheel and said ring, means supported by said ring to cause frictional engagement of said disc with said fly wheel and said ring, and means to release said disc from engagement with said fly wheel and said ring, said means comprising a shifter member, a member having a spherical seat operatively connected with said shifter member, a washer seated on said member, and clutch releasing members having their inner ends resting on said washer.

2. In a disc clutch, a fly wheel having a clutch face, a ring, a disc interposed between said clutch face and said ring, springs supported by said ring to cause frictional engagement of said disc with said clutch face and said ring, and means to release said disc from engagement with said clutch face and said ring comprising a member having a spherical seat, a member seating on said spherical seat, and clutch releasing members having their inner ends resting on said last named member.

3. In a single disc clutch for connecting a driving member to a driven member, a disc having an extension journaled in said driving member, said driven member having axial but non-rotatable movement relative to said disc, and means whereby said driving and driven members are disconnected by axially displacing said driven member relative to said driving member.

4. A disc clutch for connecting a driving member to a driven member, said driven member having axial movement relative to said driving member, a member having a spherical seat rotatably mounted on said driven member, a washer seated on said member, and clutch releasing members having their inner ends resting on said washer.

5. A single disc clutch comprising a member provided with a clutch face, a ring, a disc interposed between said clutch face and said ring, a driven member, a member having a spherical seat mounted on said driven member, a self adjusting member carried by said last-named member, and clutch releasing members pivotally supported on said ring, and having their inner ends resting on said self-adjusting member.

6. In a device of the class described, a flywheel of an internal combustion engine having a clutch face, a ring, a disc interposed between said clutch face and said ring, springs supported by said ring and positioned exterior of said fly wheel for retaining said disc in frictional engagement with the clutch face of said flywheel and said ring, a driven member having driving engagement with said disc and adapted to rotate therewith, a member rotatably mounted on said driven member, clutch throw-out arms pivotally supported on said ring and having their inner ends bearing on said second member, and means to displace said driven member axially of said flywheel to disengage said disc.

7. In a device of the class described a driving shaft having a flywheel attached thereto, a driven shaft, a ring concentric with said flywheel, springs tending to draw said ring against the adjacent face of said flywheel, a disc provided with a spindle member journaled in said driving shaft, a driven member slidably but non-rotatably attached to said disc, a thrust member rotatably mounted on said driven member, a washer having a spherical seat supported by said thrust member, clutch releasing arms pivotally supported by said ring and having their inner ends resting on said washer, said releasing arms being adapted to release said ring from engagement with said disc when the inner ends of the arms are moved rearwardly, and means for causing axial movement of said driven shaft.

8. In a clutch for connecting driving and driven elements, a member having a clutch face; a ring; a disc positioned between said member and said ring; studs secured to said ring and extending through said member; washers on the outer ends of said studs; springs surrounding said studs interposed between said washers and said member to hold said member, said ring, and said disc in frictional engagement; a thrust member rotatably mounted on said driven element; and arms pivotally supported on said ring and having their inner ends bearing against said thrust member, said arms releasing said ring from engagement with said disc when said driven element is displaced axially from said driving element.

9. In a device of the class described, a member having a clutch face, a ring, a disc positioned between said member and said ring, bolts having flanges intermediate their ends secured to said ring, heads on said bolts smaller than said flanges, apertures in said member through which said heads on said bolts can be inserted but not of sufficient size to receive said flanges, slotted washers mounted on said bolts and springs interposed between said washers and said member to retain said ring, said disc, and said member in frictional engagement.

10. In a disc clutch, a clutch face, a ring, a disc interposed between said clutch face and said ring, and means to release said disc from engagement with said clutch face and said ring, said means comprising a shifter member, a member having a spherical seat operatively connected with said shifter member, clutch releasing members operatively connected with said ring and having inwardly extending arms, and means interposed between said arms and said spherical seat to automatically equalize the pressure on said clutch releasing members.

Signed by me at Detroit, Michigan, U. S. A., this 5th day of September 1922.

ALBERT ERNEST FREY.

Witnesses:
 GLA RUSSEL FULLER,
 HODGSON S. PIERCE.